United States Patent
Hsiao et al.

(10) Patent No.: US 7,149,244 B2
(45) Date of Patent: Dec. 12, 2006

(54) ADSL ENCODER AND DECODER

(75) Inventors: Pei-Chieh Hsiao, Hsinchu (TW);
Hsin-Min Wang, Hsinchu (TW);
Huan-Tang Hsieh, Hsinchu (TW)

(73) Assignee: Realtek Semiconductor Corp. (TW)

( * ) Notice: Subject to any disclaimer, the term of this patent is extended or adjusted under 35 U.S.C. 154(b) by 0 days.

(21) Appl. No.: 11/222,593

(22) Filed: Sep. 9, 2005

(65) Prior Publication Data

US 2006/0018373 A1 Jan. 26, 2006

Related U.S. Application Data

(62) Division of application No. 10/103,471, filed on Mar. 21, 2002, now Pat. No. 7,065,142.

(30) Foreign Application Priority Data

Mar. 22, 2001 (TW) ............... 90106700 A

(51) Int. Cl.
*H04B 11/38* (2006.01)
(52) U.S. Cl. .................................... 375/222
(58) Field of Classification Search ........... 375/222, 375/246, 262, 265, 341; 714/5, 6, 702, 710, 714/711, 766, 767, 791
See application file for complete search history.

(56) References Cited

U.S. PATENT DOCUMENTS

| 6,496,954 | B1 * | 12/2002 | Ono ........................ 714/795 |
| 6,546,057 | B1 * | 4/2003 | Yeap ....................... 375/285 |
| 6,754,283 | B1 | 6/2004 | Li |
| 6,834,088 | B1 | 12/2004 | Agami et al. |

* cited by examiner

*Primary Examiner*—Khanh Tran
*Assistant Examiner*—Sam K. Ahn

(57) ABSTRACT

The present invention is an ADSL encoder and decoder. Wherein, the ADSL encoder comprises a digital signal processor, a buffer, a bit extractor and a constellation point mapper. The digital signal processor delivers data bits to the buffer, and again the delivered data bits are transmitted to the bit extractor by buffer. Bit extractor shifts partial received data bits to an extracted data. The constellation point mapper processes constellation point mapping operation corresponding to the extracted data based on transmitted bits that a sub-carrier can transmit. The ADSL decoder comprises a constellation decoder, a bit packet component and a buffer. The constellation decoder combines a horizontal axis data and a vertical axis data to packed data depending on constellation decoding procedures. The bit packet component stores extracted data to digital data in sequence, and the digital data is stored by buffer in sequence as well, then transmitted to digital signal processor.

12 Claims, 6 Drawing Sheets

ADSL ENCODER AND DECODER

RELATED CASES

This is a divisional of Ser. No. 10/103,471, filed Mar. 21, 2002, U.S. Pat. No. 7,065,142 B2.

FIELD OF THE INVENTION

The present invention is related to an ADSL network component, especially about an ADSL encoder and decoder.

BACKGROUND OF THE INVENTION

As increasing of a large amount of data transmission, requirements of bandwidth on the network are gradually advanced. To reach the requirements on network bandwidth, there are many transmission tools produced, which as ISDN modem, cable modem, asymmetrical digital subscriber line (ADSL), etc, wherein ADSL is the most type to be used for a wideband transmission.

Each transmission type has its own encoder and decoder for its convenience and speed. Talking about ADSL, general affair is to individually install a memory device to an ADSL encoder and an ADSL decoder. The memory device stores a constellation diagram when encoding and decoding. While the ADSL encoder/decoder encoding/decoding data for transmitting/receiving, encode/decode parameters comparative to constellation diagrams in the memory devices shall be found according to at the time of encoding/decoding conditions. After the encoding/decoding parameters being found, data for transmitting/receiving just can be processed for continuing encode/decode process.

As a conclusion, the prior arts of encoder and decoder are to install storage devices having constellation diagrams firstly; the encode/decode process is then executed after the comparative encode/decode parameters being found.

Based on the aforesaid issues, the present inventor of the patent has being studied and referred to practical experiences and theory for designing and effectively improving the prior arts.

SUMMARY OF THE INVENTION

The first objective of the present invention is to offer an ADSL encoder and decoder, which rapidly encodes data for transmitting and decodes data for receiving without constellation diagrams.

The second objective of the present invention is to offer an ADSL encoder to handle digital data. The digital data comprises at least one bit, and a sub-carrier for transmitting includes data together with transmitted bits. The ADSL encoder comprises a digital signal processor, a buffer, a bit extractor and a constellation point mapper. The digital signal processor transmits digital data to the buffer, and buffer receives the digital data from digital signal processor and stores bits in digital data in sequence. The bit extractor receives the digital data one byte by one byte from buffer and shifts the aforesaid data including transmitted bits to extracted data. The constellation point mapper starts constellation point mapping operation corresponding to extracted data based on transmitted bits.

The third objective of the present invention is to offer an ADSL decoder to process horizontal axis data and vertical axis data input from exterior. The ADSL decoder comprises a constellation point demapper, a bit packet component and a buffer. The constellation point demapper combines the horizontal axis data and the vertical axis data to a set of the extracted data based on constellation decoding procedure. The bit packet component stores the extracted data to become digital data with at least one bit in sequence. The buffer stores the digital data in sequence from bit packet components and transmits digital data to the digital signal processor.

The present invention adopts logic circuits to make ADSL encoder and decoder dealing with encoding and decoding procedures without searching constellation diagram, and further, the storage device in ADSL encoder and decoder is no longer existed.

The appended drawings will provide further illustration of the present invention, together with description; serve to explain the principles of the invention.

DETAILED DESCRIPTION OF THE PRESENT INVENTION

Figure 1:
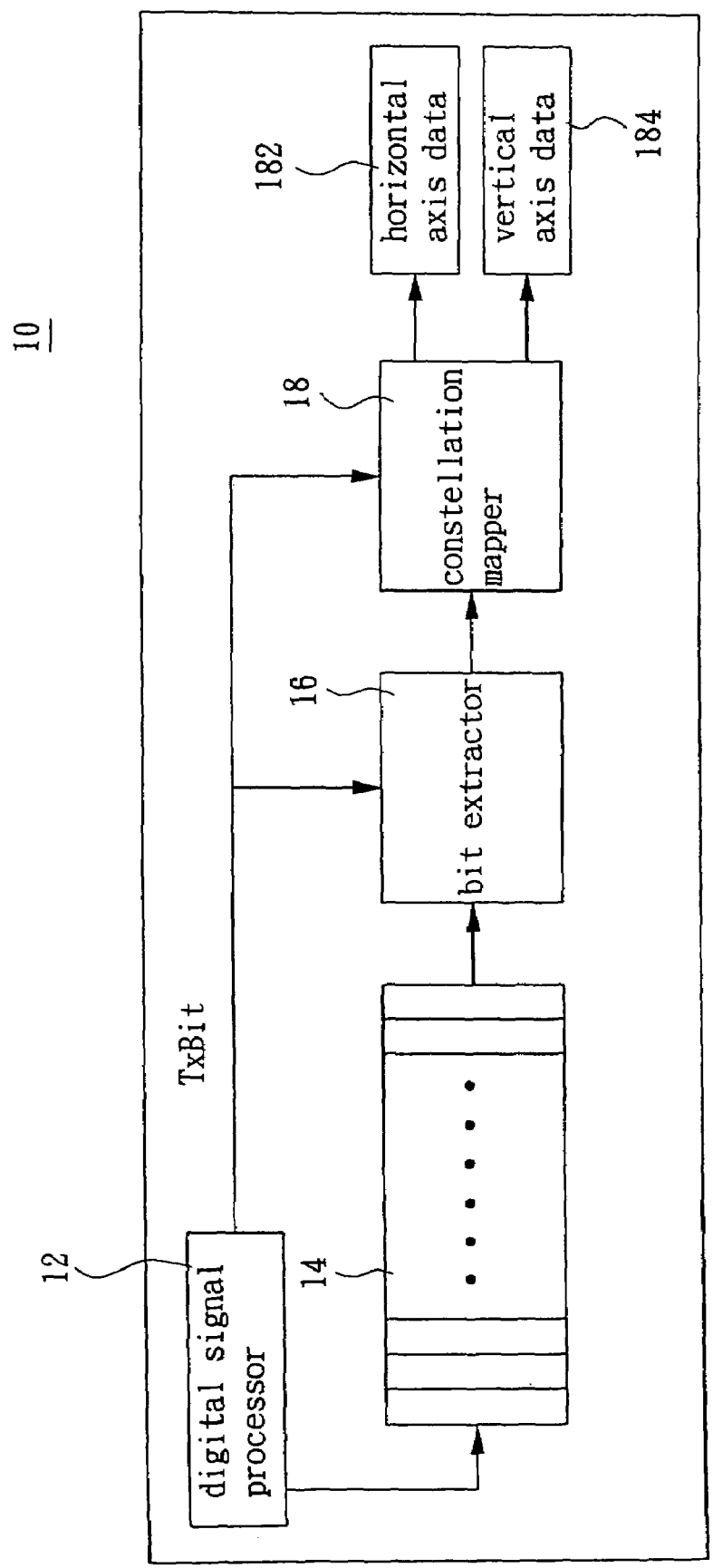
FIG. 1 is a block diagram of the first preferred embodiment of the ADSL encoder for the present invention.

Please refer to FIG. 1, which is a block diagram of the first preferred embodiment of the ADSL encoder for the present invention. The ADSL encoder 10 comprises a digital signal processor 12, a buffer 14, a bit extractor 16 and a constellation point mapper 18. The digital signal processor 12 transmits digital data to the buffer 14. The buffer 14 receives and stores the digital data to the bit extractor 16 in sequence. Bit extractor 16 receives digital data from the buffer 14 one byte by one byte and shifts a TxBit defined as a total number of the transmitted data bits to extracted data 166. The constellation point mapper 18 starts constellation point mapping operation corresponding to extracted data 166 based on transmitted bits (TxBit).

Figure 2A:
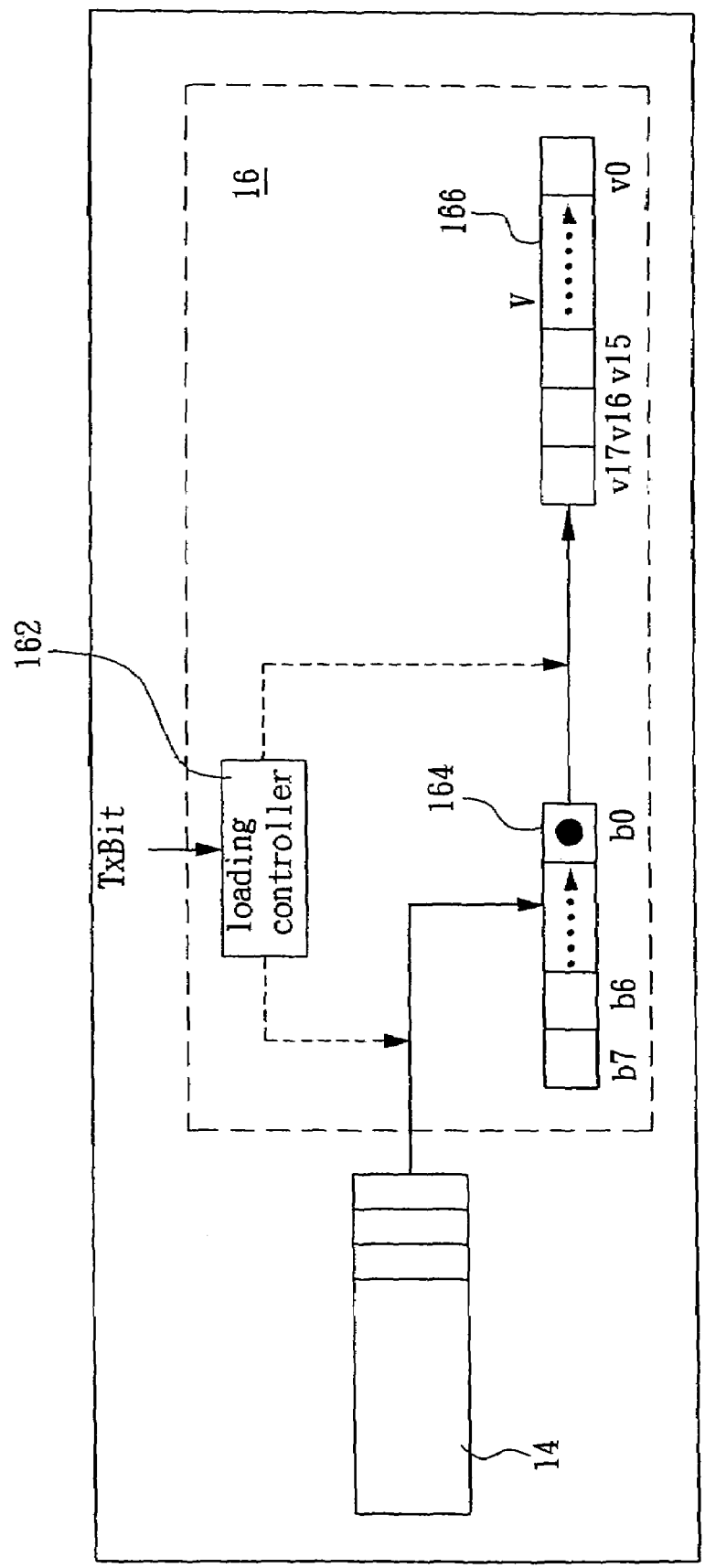
FIG. 2A is a block diagram of the internal bit extractor of the preferred embodiment in FIG. 1.

Following will be further described for ADSL encoder manipulation. Please refer to FIG. 2A, which is a block diagram of the bit extractor 16 of the preferred embodiment in FIG. 1. Bit extractor 16 comprises a byte storage 164 for storing the transmitted data bits from buffer 14, a set of extracted data 166 and a loading controller 162. The transmitted data bits in the buffer 14 is transmitted to the byte storage 164 by every single byte, consequently, byte storage 164 shifts the data bits to the extracted data 166 one after the other. Before every encoding, the extracted data is reset to 0×30000. In the preferred embodiment, the loading controller 162 is to control that the transmitted data is forwarded or not, and a control method for loading controller 162 is based on the transmitted bits (TxBit) to control the data forwarding. The transmitted bits are defined as the data bits transmitted in a sub-carrier. For example, if the transmitted bits (TxBit) are b; amount of the constellation points are $2^b$. After all data in byte storage 164 shifting to extracted data 166, loading controller 162 lets one byte of data bit in buffer 14 load into byte storage 164. Besides, when an amount of data bits in byte storage 164 equal to transmitted bits forwarding to extracted data 166, loading controller 162 temporarily stops forwarding data from byte storage 164 to extracted data 166.

Figure 2B:
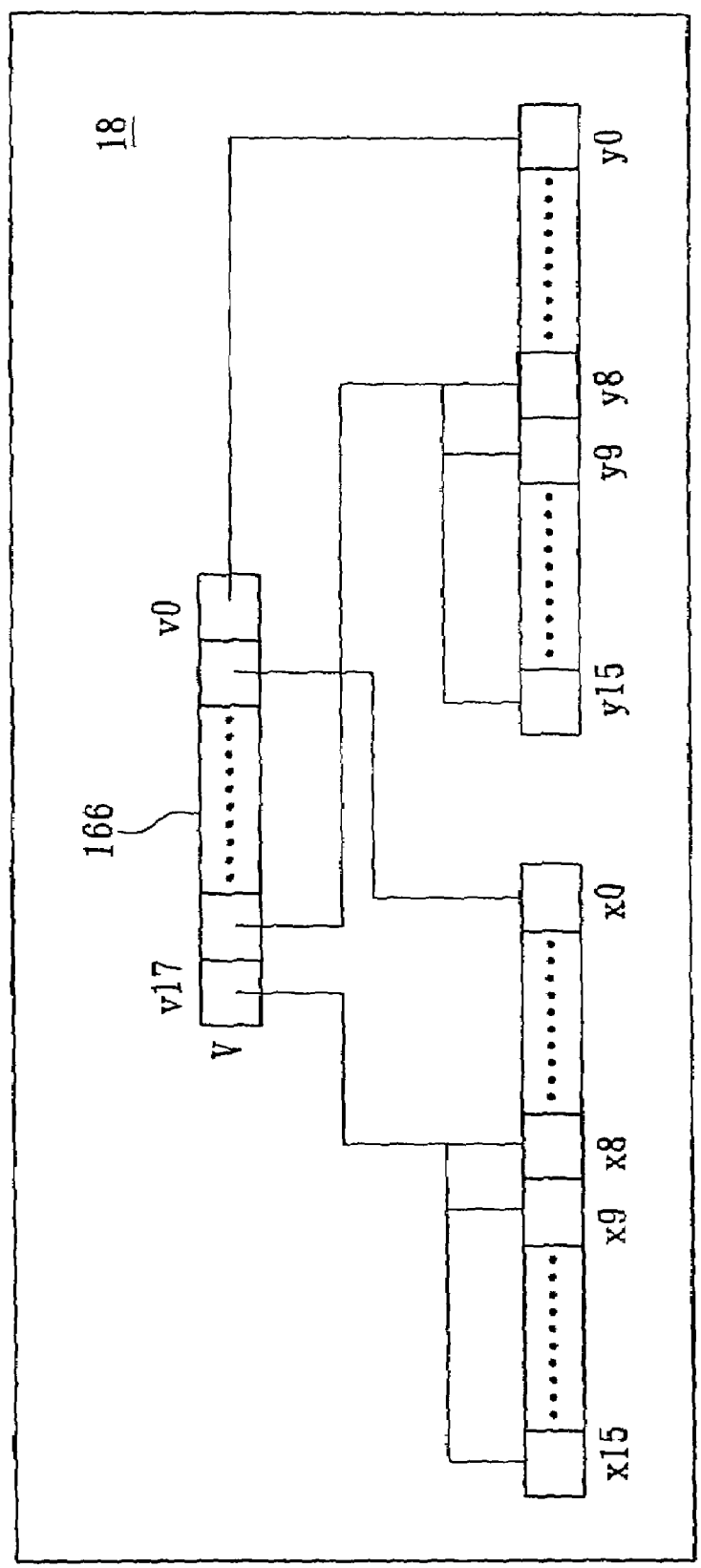
FIG. 2B is a scheme of the constellation point mapper of the preferred embodiment in FIG. 1.

After data bits whose amount equal to transmitted bits being forwarded into extracted data 166, constellation point mapper 18 starts point-mapping operation based on the value of transmitted bits. Please refer to FIG. 2B, which is a scheme of the constellation point mapper 18 of the preferred embodiment in FIG. 1. A notice is that extracted data 166 is transmitted from bit extractor 16 to constellation point mapper 18, and therefore extracted data 166 is appeared both in FIG. 2A and FIG. 2B. This is not to limit following conditions: a storage device for storing extracted data 166 in between bit extractor 16 and constellation point mapper 18, two storage devices in both, none in both or any others.

In constellation point mapper 18, extracted data 166 is started constellation point mapping operation based on transmitted bits. The operation shall be engaged by logic circuits or cooperation of software and hardware, hence there is no corresponding circuits shown in figure, and instead of some formulas. Following is formulas of constellation corresponding to transmitted bits, and v17 represents the most significant bit of extracted data 166; following are v16, v15, etc., and the last one is v0; assuming a value of the transmitted bits is b, then:

When above constellation point mapping operation is done, each bit in extracted data 166 is transmitted to the horizontal axis data 182 and the vertical axis data 184 (shown in FIG. 1) individually. Wherein, from the lowest bit of v0 to the most significant bit of v16, the bits in extracted data 166 are stored in vertical axis data one bit by one bit. Further detail is v0 is filled out in vertical axis data of y0, v2 is filled out in vertical axis data of y1 and v4 is filled out in vertical axis data of y2, till v16 in y8. Other bits in vertical axis data as y9 to y15 are filled out with a value of v16 for each. Comparatively, from a second lowest bit of v1 to a bit of v17, the bits in extracted data 166 are stored in horizontal axis data one bit by one bit. Which means v1 is filled out in horizontal axis data of x0, v3 is filled out in horizontal axis data of x1, v5 is filled out in horizontal axis data of x2, till v17 in x8. Other bits in horizontal axis data as x9 to x15 are filled out with a value of v17 for each.

After above operation, horizontal axis data and vertical axis data shall be individually forwarded to a signal-receiving end via ADSL network and ADSL dispatching end. After the signal-receiving end receiving the data, decoder decodes the data to transfer correct digital information.

Figure 3:
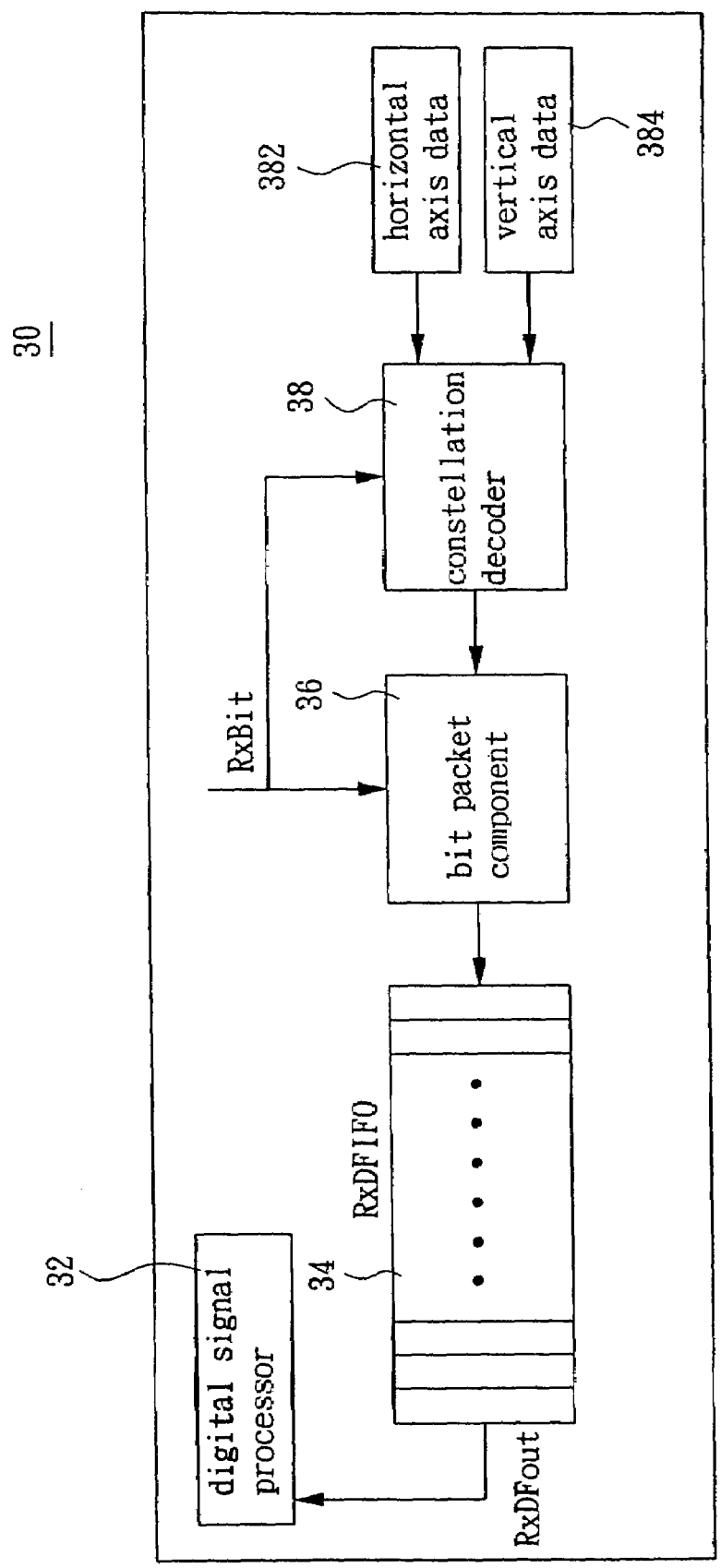
FIG. 3 is a block diagram of the first preferred embodiment of the ADSL decoder for the present invention.

Please refer to FIG. 3, which is a block diagram of the first preferred embodiment of the ADSL decoder for the present invention. In the embodiment, an ADSL decoder 30 comprises a digital signal processor 32, a buffer 34, a bit packet component 36 and a constellation point demapper 38. X-axis constellation data 382 and y-axis constellation data 384 from ADSL network are individually input into the constellation point demapper 38 for decoding.

Figure 4A:
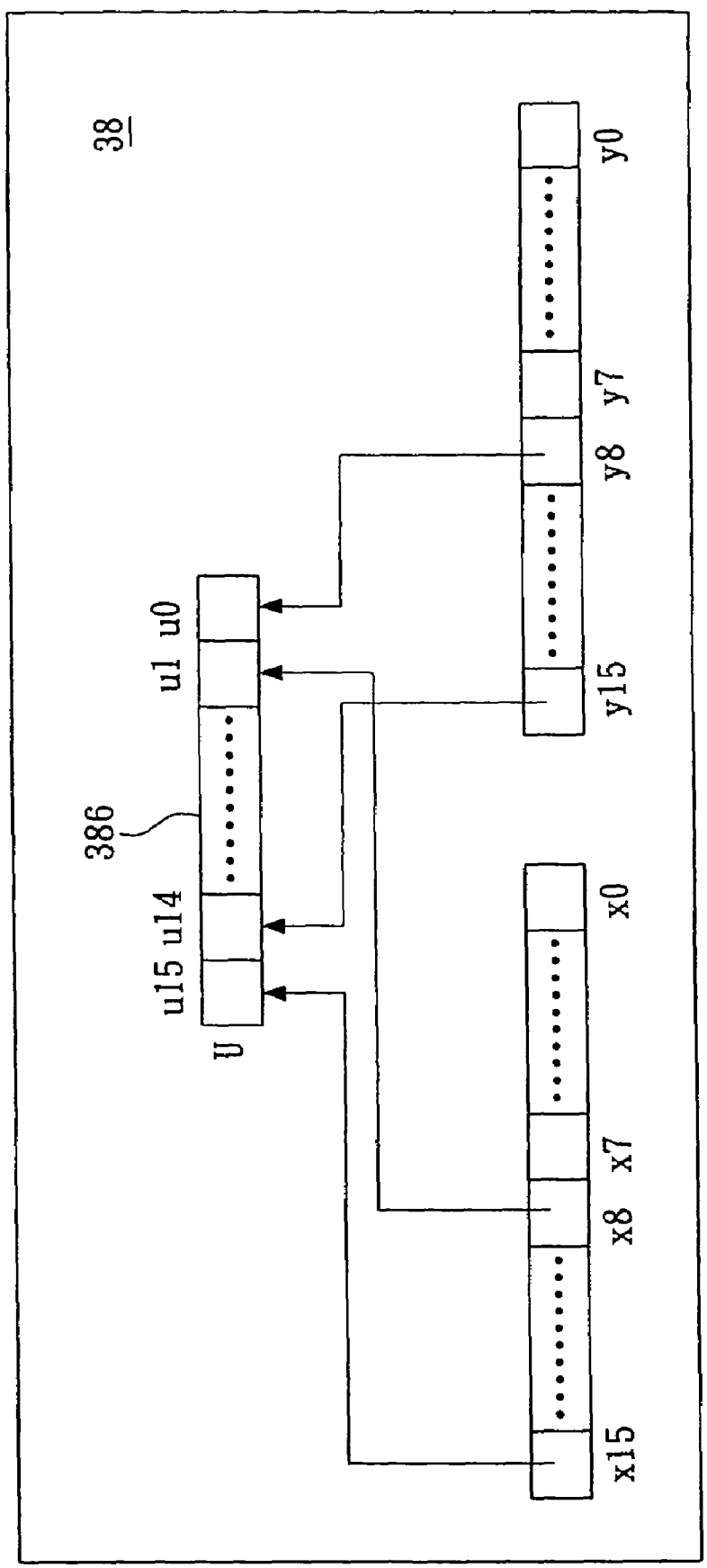
FIG. 4A is a scheme of the constellation point demapper of the preferred embodiment in FIG. 3.

Please refer to FIG. 4A, which is a scheme of the constellation point demapper 38 of the preferred embodiment in FIG. 3. Wherein, from the most significant bit of packed data 386, a method of filling out one byte of data with every other bit is used to fill the most significant eight bits (x15 to x8) of horizontal axis data out into packed data 386 in sequence. Which means an x15 is in a $\mu15$, an x14 is in a $\mu13$, an x13 is in a $\mu11$, till an x8 in a $\mu1$. Comparatively, from a second most significant bit ($\mu14$) of packed data 386, a method of filling out one byte of data with every other bit is used to fill the most significant eight bits (y15 to y8) of vertical axis data out into packed data 386 in sequence. Which means a y15 is in a $\mu14$, a y14 is in a $\mu12$, a y13 is in a $\mu10$, till y8 in a $\mu0$.

Hence, different constellation decoding procedures are processed, because aforesaid the value of receiving bits are different than the transmitted bits from the sub-carrier on ADSL. Therefore, assuming a value of RxBit from constellation point demapper 38 in FIG. 3 is b, and the constellation decoding procedures according to a difference of value b are as following:

(1) When b is even:
  shifting packed data 386 16-b bits toward right; and
  shifting from the lowest bit in packed data 386 b bits toward right to bit packet component 36.

(2) When b is equal to 3:

$$X_b = \mu15 \oplus \mu13 + \mu14 \oplus \mu12;$$

shifting packed data 386 one bit toward left;

$$\mu15 = X_b;$$

shifting packed data 386 16-b bits toward right; and
  shifting from the lowest bit in packed data 386 b bits toward right to bit packet component 36.

(3) When b is odd and greater than 3:

$$X_b = \mu15 \oplus \mu13 + \mu14 \oplus \mu12;$$

$$Y_b = \mu15 \cdot \mu13 + (\mu15 \oplus \mu13) \cdot \mu14;$$

$$Z_b = \mu14 \cdot \mu12 + (\mu14 \oplus \mu12) \cdot \overline{\mu15};$$

shifting packed data 386 16-b bits toward right;

$$\mu15 = X_b;$$

$$\mu14 = Y_b;$$

$$\mu13 = Z_b;$$

shifting packed data 386 16-b bits toward right; and
  shifting from the lowest bit in packed data 386 b bits toward right to bit packet component 36.

When above constellation decoding procedures are finished, data is then delivered to bit packet component 36. Although, packed data 386 is appeared both in FIG. 4A and FIG. 4B. This is not to limit following conditions: a storage device for storing packed data 386 in between bit packet component 36 and constellation point demapper 38, two storage devices in both, none in both or any others.

Figure 4B:
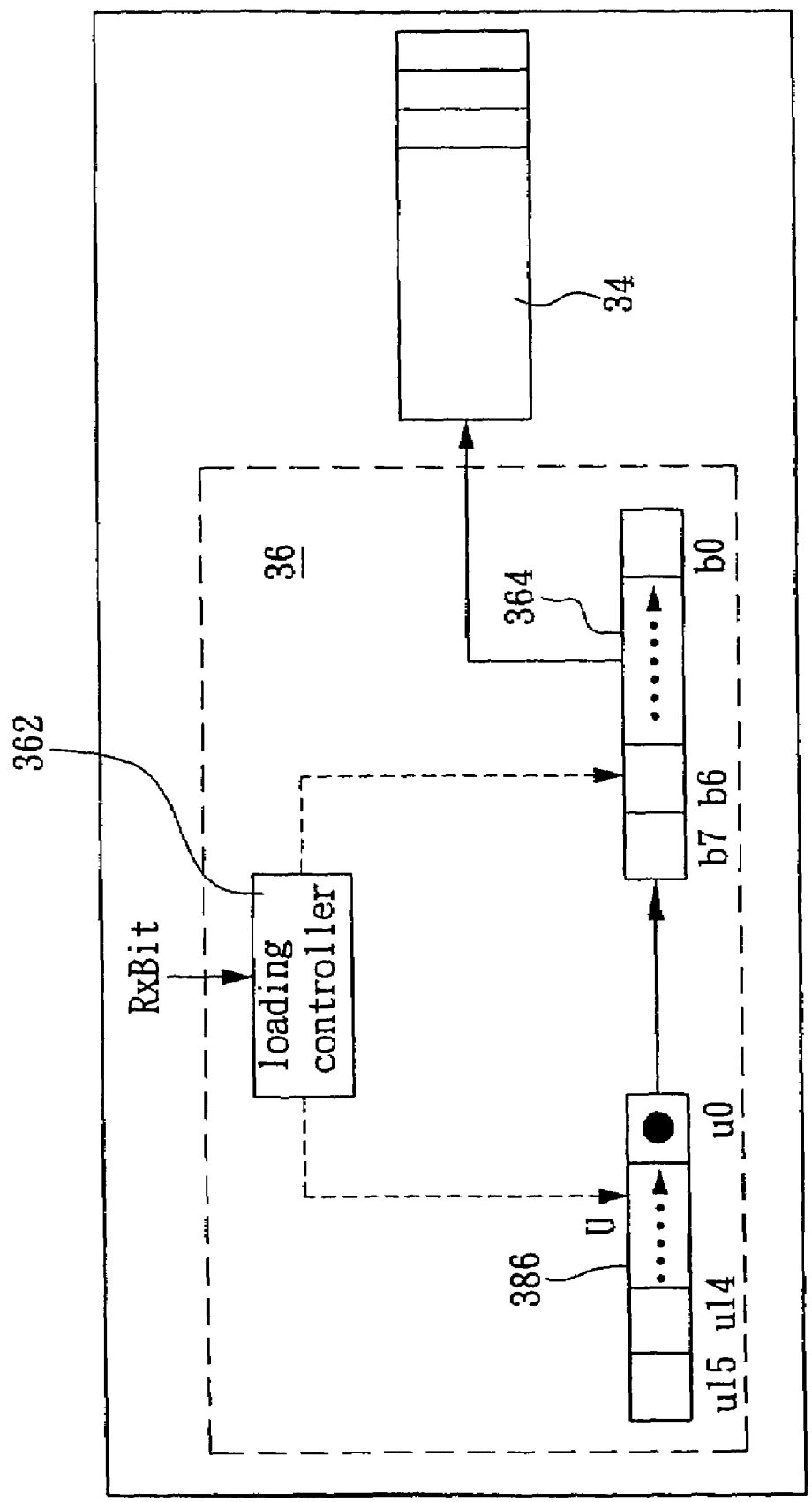
FIG. 4B is a block diagram of the bit packet component of the preferred embodiment in FIG. 3.

Please refer to FIG. 4B, which is a block diagram of the bit packet component 36 of the preferred embodiment in FIG. 3. When data in packed data 386 shifting to a byte storage 364, the available lowest bit is stored firstly, and then the second lowest one. Which means data is stored in b7, then b6, b5, till to b0. A storage controller 362 puts 8 bits (1 byte) in the byte storage 364, and data in byte storage 364 is then transmitted to a buffer 34 when the buffer 34 has enough memory. Continuously, data in buffer 34 is forwarded to digital signal processor 32 for following procedures.

As a conclusion, advantages from the present invention are listed as following: encoding and decoding can be processed without searching constellation diagram. Therefore, a storage device for storing constellation diagram is no longer needed and some time for searching constellation diagram can be saved.

While the present invention has been shown and described with reference to preferred embodiments thereof, and in terms of the illustrative drawings, it should be not considered as limited thereby. Thus, the present invention is infinitely used. However, various possible modification, omission, and alterations could be conceived of by one skilled in the art to the form and the content of any particular embodiment, without departing from the scope and the sprit of the present invention.

The invention is disclosed and is intended to be limited only the scope of the appended claims and its equivalent area.

What is claimed is:

1. A constellation decoding procedure for an ADSL decoder, the ADSL decoder including a constellation decoder, a bit packet component, and a buffer for processing an x-axis data and a y-axis data, the constellation decoding procedure includes the following steps:

filling a packed data in sequence starting from a most significant bit and then every other bit with the bits of the x-axis data;
   filling a packed data in sequence starting from a second most significant bit and then every other bit with the bits of the y-axis data; and
   shifting the packed data towards the right by subtracting an amount of received data bits from N wherein N is an integer;
   wherein the amount of received data bits delivered by a sub-carrier on the constellation decoder is even.

2. The constellation decoding procedure of claim 1, wherein the x-axis data is a horizontal data of a constellation map and the y-axis data is a vertical axis data of the constellation map.

3. The constellation decoding procedure of claim 1, wherein the x-axis data is a vertical data of a constellation map and the y-axis data is a horizontal axis data of the constellation map.

4. The constellation decoding procedure of claim 1, wherein N=16.

5. A constellation decoding procedure for an ADSL decoder, the ADSL decoder including a constellation decoder, a bit packet component, and a buffer for processing an x-axis data and a y-axis data, the constellation decoding procedure includes the following steps:

filling a packed data in sequence starting from a most significant bit and then every other bit with the bits of the x-axis data;
   filling the packed data in sequence starting from a second most significant bit and then every other bit with the bits of the y-axis data;
   processing an XOR operation of the most significant bit and a third most significant bit of the packed data to obtain a first result;
   processing the XOR operation of the second most significant bit and a fourth most significant bit to obtain a second result;
   processing an OR operation of the first result and the second result to obtain a first temporary bit;
   shifting the packed data one bit towards the left;
   configuring the most significant bit of the packed data to the first temporary bit; and
   shifting the packed data towards the right by an amount of subtracting 3 from N wherein N is an integer;
   wherein the amount of received data bits delivered by a sub-carrier on the constellation decoder is 3.

6. The constellation decoding procedure of claim 5, wherein the x-axis data is a horizontal data of a constellation map and the y-axis data is a vertical axis data of the constellation map.

7. The constellation decoding procedure of claim 5, wherein the x-axis data is a vertical data of a constellation map and the y-axis data is a horizontal axis data of the constellation map.

8. The constellation decoding procedure of claim 5, wherein N=16.

9. A constellation decoding procedure for an ADSL decoder, the ADSL decoder including a constellation decoder, a bit packet component, and a buffer for processing an x-axis data and a y-axis data, the constellation decoding procedure includes the following steps:

filling a packed data in sequence starting from a most significant bit and then every other bit with the bits of the x-axis data;
   filling the packed data in sequence starting from a second most significant bit and then every other bit with the bits of the y-axis data;
   processing an XOR operation of the most significant bit and a third most significant bit to obtain a first result;
   processing the XOR operation of the second most significant bit and a fourth most significant bit to obtain a second result;
   processing an OR operation of the first result and the second result to obtain a first temporary bit;
   processing an AND operation of the most significant bit and the third most significant bit to obtain a third result;
   processing the XOR operation of the most significant bit and the third most significant bit to obtain a first XOR operation result;
   processing the AND operation of the first XOR operation result and the second most significant bit to obtain a fourth result;
   processing the OR operation of the third result and the fourth result to obtain a second temporary bit;
   processing the AND operation of the second most significant bit and the fourth most significant bit to obtain a fifth result;
   processing the XOR operation of the second most significant bit and the fourth most significant bit to obtain a second XOR operation result;
   processing the AND operation of the second XOR operation result and a complement of the most significant bit to obtain a sixth result;
   processing the OR operation of the fifth result and the sixth result to obtain a third temporary bit;
   shifting packed data one bit towards the left;
   configuring the second most significant bit of the packed data to the second temporary bit;
   configuring the third most significant bit of the packed data to the third temporary bit; and
   shifting the packed data towards the right by subtracting an amount of received data bits from N wherein N is an integer;
   wherein the amount of received data bits delivered by a sub-carrier on the constellation decoder is greater than 3.

10. The constellation decoding procedure of claim 9, wherein the x-axis data is a horizontal data of a constellation map and the y-axis data is a vertical axis data of the constellation map.

11. The constellation decoding procedure of claim 9, wherein the x-axis data is a vertical data of a constellation map and the y-axis data is a horizontal axis data of the constellation map.

12. The constellation decoding procedure of claim 9, wherein N=16.

* * * * *